(12) United States Patent
Kanade et al.

(10) Patent No.: US 8,876,354 B2
(45) Date of Patent: Nov. 4, 2014

(54) LIGHT SOURCE COMPRISING LIGHT DEFLECTING PARTICLES

(76) Inventors: Udayan Kanade, Pune (IN); Ruby Rama Praveen, Pune (IN); Sanat Ganu, Pune (IN); Dimple Kuriakose, Pune (IN)

( * ) Notice: Subject to any disclaimer, the term of this patent is extended or adjusted under 35 U.S.C. 154(b) by 299 days.

(21) Appl. No.: 13/319,092

(22) PCT Filed: May 6, 2010

(86) PCT No.: PCT/IB2010/052009
§ 371 (c)(1),
(2), (4) Date: Nov. 7, 2011

(87) PCT Pub. No.: WO2010/128481
PCT Pub. Date: Nov. 11, 2010

(65) Prior Publication Data
US 2012/0051092 A1    Mar. 1, 2012

(30) Foreign Application Priority Data
May 6, 2009    (IN) .......................... 1193/MUM/2009

(51) Int. Cl.
*F21V 8/00*    (2006.01)

(52) U.S. Cl.
CPC .............. *G02B 6/001* (2013.01); *G02B 6/0061* (2013.01); *G02B 6/0041* (2013.01)
USPC ......................................... 362/615; 362/629

(58) Field of Classification Search
USPC ................................................ 362/615, 629
See application file for complete search history.

(56) References Cited

U.S. PATENT DOCUMENTS

| 5,542,017 | A | * | 7/1996 | Koike ............................. 385/123 |
| 6,290,364 | B1 | * | 9/2001 | Koike et al. .................... 362/620 |
| 7,278,775 | B2 | * | 10/2007 | Yeo et al. ........................ 362/627 |
| 2006/0056166 | A1 | | 3/2006 | Yeo et al. |
| 2007/0086176 | A1 | * | 4/2007 | Kanade et al. ................... 362/16 |
| 2008/0007965 | A1 | | 1/2008 | Kanade et al. |
| 2008/0007967 | A1 | * | 1/2008 | Kanade et al. ................ 362/613 |
| 2008/0044564 | A1 | * | 2/2008 | Kanade et al. ................ 427/203 |
| 2009/0141476 | A1 | * | 6/2009 | Meir et al. ........................ 362/84 |
| 2010/0195349 | A1 | * | 8/2010 | Kanade et al. ................ 362/607 |
| 2010/0208489 | A1 | * | 8/2010 | Kanade et al. ................ 362/601 |
| 2012/0051093 | A1 | * | 3/2012 | Kanade et al. ................ 362/629 |

FOREIGN PATENT DOCUMENTS

| EP | 1895230 A2 | 3/2008 |
| WO | IB2010/052009 | 12/2010 |

* cited by examiner

Primary Examiner — Laura Tso (57) ABSTRACT

A first light source system comprises a light guide with light deflecting particles. If its light emission function and concentration variation function (of the light deflecting particles) are known, then a similar second light source system with a desired light emission function can be designed using the following method. The concentration variation function of the second light source system is obtained by mutating the concentration variation function of the first light source system using the same mutating function that mutates the light emission function of the first light source system into the light emission function of the second light source system.

2 Claims, 9 Drawing Sheets

LIGHT SOURCE COMPRISING LIGHT DEFLECTING PARTICLES

This application claims priority from provisional patent application 1193/MUM/2009 titled "Light Source Comprising Light Deflecting Particles" filed in Mumbai, India on 6 May 2009.

TECHNICAL FIELD

The present invention relates to light sources. More particularly, the invention relates to light sources that have light deflecting particles within them.

BACKGROUND ART

Different types of light sources are well-known in the art. Point light sources emit light from a small region. E.g. an LED (Light Emitting Diode), a LASER (Light Amplification by Stimulated Emission of Radiation) or a filament can act as a point light source. Linear light sources emit light from a region which has one large dimension. A linear light source could be shaped like a tube with circular, square or other cross section, e.g. a bank of LEDs, a fluorescent tube, a gas discharge tube, an incandescent filament. Surface light sources emit light from a region which has two large dimensions.

A light guide is an object that guides light within it. A light guide may comprise a transparent material of a refractive index larger than the refractive index of a surrounding material, and will guide light by total internal reflection. A light guide may also comprise a reflective cavity, and will guide light by reflection.

A light deflector is an element that deflects light traveling within a light guide. A light deflector may be a small transparent particle or bubble, which deflects light incident on it by refraction, reflection at the boundary, by diffusion inside the particle, by scattering, or by total internal reflection. Light deflectors may be aspherical particles embedded in a specific orientation with respect to the light guide. Light deflectors may change the wavelength of light. For example a light deflector may contain photoluminescent material. Light deflectors may be irregularities or small white dots or geometric shapes, such as prisms or lenses.

SUMMARY

A first light source system comprises a light guide with light deflecting particles. If its light emission function and concentration variation function (of the light deflecting particles) are known, then a similar second light source system with a desired light emission function is designed as follows. The concentration variation function of the second light source system is obtained by mutating the concentration variation function of the first light source system using the same mutating function that mutates the light emission function of the first light source system into the light emission function of the second light source system.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF DRAWINGS

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

A first light source system comprises a light guide with light deflecting particles. If its light emission function and concentration variation function (of the light deflecting particles) are known, then a similar second light source system with a desired light emission function can be designed using the following method. The concentration variation function of the second light source system is obtained by mutating the concentration variation function of the first light source system using the same mutating function that mutates the light emission function of the first light source system into the light emission function of the second light source system.

A function $f:[0,umax] \to R+$ (R+ stands for the set of non-negative real numbers) is said to be mutable into a function $g:[0,vmax] \to R+$ if there exists a differentiable strictly increasing onto function $p:[0,vmax] \to [0,umax]$, such that $$g(v)=f(p(v))p'(v)$$

where ' stands for differentiation.

In another embodiment, a function $f:(0,umax) \to R+$ is said to be mutable into a function $g:(0,vmax) \to R+$ if there exists a differentiable strictly increasing onto function $p:(0,vmax) \to (0,umax)$, such that $$g(v)=f(p(v))p'(v)$$

Such a function p is a mutator function which mutates f into g. g is the mutation of f due to p. If p is a mutator function which mutates f into g, then the inverse function of p is a mutator function which mutates g into f. If p mutates f into g and q mutates g into h, then the composition $p(q(.))$ is a function which mutates f into h.

If we know a function f, and a mutator function p, the function g which is the mutation of f due to p can be found by $g(v)=f(p(v))p'(v)$. This expression may be evaluated at as many points as required to get a high resolution tabulation of the function g. In some cases, the expression may be further simplified. For example, if both p and f are polynomials, then the expression may easily be evaluated to give a single polynomial.

In certain cases, p and f may be polynomials of infinite order. For example, we may know the Taylor series of the functions f and p. In this case, the function g may also be evaluated as a polynomial of infinite order. For evaluating a particular coefficient in such a polynomial, coefficients of f of the same and lower degree are needed, and coefficients of p up to one degree higher are needed. In particular, let the series representations of f, p and g be, respectively $$f(u)=f0u^0+f1u^1+f2u^2+\ldots$$

$$p(v)=p1v^1+p2v^2+\ldots$$

$$g(v)=g0v^0+g1v^1+g2v^2+\ldots$$

Since $p(0)=0$, there is no p0 term in the expansion of p. Then, the ith coefficient in the expansion of g is given by the expression $$g_i = \sum_{j=0}^{i}(i-j+1)p_{i-j+1}\left(\sum_{k=0}^{j}f_k\left(\sum_{\Sigma_{m=1}^k l_m=j}\left(\prod_{m=1}^{k}p_{l_m}\right)\right)\right) \quad \text{[Math. 1]}$$

and $g0=p1\,f0$.

The above formula is a finite expression for any particular gi, and thus, coefficients of the series representation of g may be evaluated to any required order, so that a required precision may be achieved. The symbol $$\sum_{\Sigma_{m=1}^k l_m=j} \quad \text{[Math. 2]}$$

in the above expression is interpreted as sum over all k-tuples of positive integers (l1, l2, . . . lk) such that l1+l2+ . . . lk=j. For k=0 and j=0, the sum is over the empty tuple ( ), since its elements add up to 0; the product of the elements of the empty tuple is 1.

If we know a function g, and a mutator function p, the function f such that p mutates f to g can be found by $f(u)=g(r(u))r'(u)$ where r is the inverse function of p. For certain functions, the inverse of that function may be another well known mathematical function. Even if the inverse is not a well known mathematical function, since p is a differentiable strictly increasing onto function, its inverse (also a differentiable strictly increasing onto function) may be numerically evaluated using methods such as bisection method, Newton-Raphson method, etc. and then tabulated to any required resolution. Such tabulated values of a function may be used to give a polynomial or other basis approximation of the function using methods such as curve fitting, regression fitting, Fourier transform, etc.

In certain cases, p may be a polynomial of infinite order. For example, we may know the Taylor series of p. In this case, the function r may also be evaluated as a polynomial of infinite order. For evaluating a particular coefficient of the polynomial representing r, coefficients of p of the same and lower order are required. In particular, let the series representation of p and r be, respectively $$p(v)=p1v^1+p2v^2+\ldots$$

$$r(u)=r1u^1+r2u^2+\ldots$$

Then, the jth coefficient of the function r(p(v)) will be 1 for j=1 and zero otherwise, since r(p(v))=v. This gives the following equations, one equation for each j:

$$\sum_{k=1}^{j} r_k \left( \sum_{\Sigma_{m=1}^{k} l_m = j} \left( \sum_{m=1}^{k} p_{l_m} \right) \right) = \begin{cases} 1, & \text{for } j=1 \\ 0, & \text{otherwise} \end{cases} \quad [\text{Math. 3}]$$

The first of these equations, involves only r1, the second involves r1 and r2, the third involves r1, r2 and r3, and so forth. Thus, using the first equation (with j=1), r1 can be evaluated, then using the second equation, and the previously evaluated value of r1, r2 can be evaluated, and so forth. Thus, coefficients of the series representation of r may be evaluated to any required order, so that a required precision may be achieved.

Thus, if we know a function g, and a mutator function p, the function f such that p mutates f to g can be found by first finding a function r that mutates g to f, r being the inverse function of p, and then finding f, which is the mutation of g due to r, which can be found using f(u)=g(r(u))r'(u), as has been described before.

If two integrable functions f and g are mutations of each other, then their total integration is equal, i.e.

$$\int_{0}^{umax} f(u) du = \int_{0}^{vmax} g(v) dv \quad [\text{Math. 4}]$$

Furthermore, for any two integrable functions f and g whose total integration is equal, a function p that mutates f to g can be found, as explained below.

In an embodiment, let f and g be two functions whose total integration is equal, and let f be a non-zero constant function f(u)=f(0). Then, g(v)=f(p(v))p'(v) simplifies to g(v)=f(0)p'(v) which can be easily solved using $$p(v) = \frac{1}{f(0)} \int_{0}^{v} g(\tilde{v}) d\tilde{v} \quad [\text{Math. 5}]$$

The integral of well known functions might sometimes be well known. The integral of a function may also be numerically evaluated and tabulated at any required resolution and precision. If g is known as a polynomial, of finite or infinite degree, then p can also be represented as a polynomial using the above formula, since the integration of each term of the polynomial is easy to evaluate.

In another embodiment, let f and g be two functions whose total integration is equal, and let g be a constant function g(u)=g(0). To find a function p that mutates f into g, we first find a function r that mutates g to f using the above methodology, and then find p as the inverse function of r. The inverse function of r may be well known, or can be numerically evaluated, or can be evaluated as a polynomial, as has been disclosed above.

In yet another embodiment, let f and h be two functions whose total integration is equal, and none of which needs to be a constant function. Let $$\int_{0}^{umax} f(u) du = \int_{0}^{wmax} h(w) dw = L \quad [\text{Math. 6}]$$

Define g: [0,L]→R+ to be the constant function g(v)=1. (In the case that f and h are defined on open intervals, g is a constant function (equal to 1) defined on (0,L).) Now, we find the mutator functions p mutating f into g and q mutating g into h, and their composition p(q(.)) is a function that mutates f to h. Since g is a constant function both p and q can be found as disclosed above. In particular, $$q(w) = \int_{0}^{w} h(\tilde{w}) d\tilde{w} \quad [\text{Math. 7}]$$

and p is the inverse function of r, where r is the function $$r(u) = \int_{0}^{u} f(\tilde{u}) d\tilde{u} \quad [\text{Math. 8}]$$

The inverse may be a well known function, or can be numerically evaluated, or can be evaluated as a polynomial as has been disclosed above. Once both the functions p and q are known, the required mutator function p(q(.)) can be evaluated in the functional composition form, i.e. in the form "p(q(.))", or in certain cases, the functional composition may be algebraically simplified. The values of the composed function may be tabulated at any required resolution and accuracy. If both p and q are known as finite or infinite polynomials, the composed function may also be evaluated as a polynomial. In particular, let the series representation of p, q and p(q(.)) be, respectively, $$p(v) = p1v^{\wedge}1 + p2v^{\wedge}2 + \ldots$$

$$q(w) = q1w^{\wedge}1 + q2w^{\wedge}2 + \ldots$$

$$p(q(w)) = s1w^{\wedge}1 + s2w^{\wedge}2 + \ldots$$

Then the jth coefficient in the expansion of p(q(.)) is given by the expression $$s_j = \sum_{k=1}^{j} p_k \left( \sum_{\Sigma_{m=1}^{k} l_m = j} \left( \prod_{m=1}^{k} q_{l_m} \right) \right) \quad [\text{Math. 9}]$$

The above formula is a finite expression for any sj, and thus coefficients of the series representation of p(q(.)) may be evaluated to any required order, so that a required precision may be achieved.

In this way for any two functions whose total integral is equal, a mutator function mutating one into the other is found.

Figure 1:
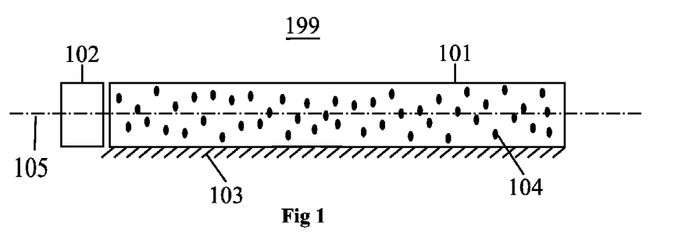
FIG. 1 depicts a light source system, according to an embodiment.

FIG. 1 depicts a light source system 199, according to an embodiment. A primary light source 102 emits light into one end of a light guide 101. The light guide 101 is made of transparent material. It guides light by reflection or total internal reflection. The light guide 101 may have minors such as mirror 103 surrounding it so that light exits in only certain directions or from some part of the apparatus. The cross section of the light guide 101 may be square, rectangular, circular, prismatic, triangular, right isosceles triangular, pentagonal, etc. Various cross sections accommodate larger primary light sources, or have thinner exit surfaces, or extract light more efficiently in the presence of minors and light deflecting particles, one or more of which may be important requirements for particular applications. The cross section of the light guide 101 may be an elongated rectangle, one of whose dimensions is much larger than another, (or another elongated shape such as an elongated oblong, elongated rectangle with rounded corners, elongated trapezium, etc.) such that the light guide 101 forms a sheet, having two large surfaces.

The light guide 101 has a dispersion of light deflecting particles 104 which deflect light by reflection, refraction, total internal reflection or scattering. Light from the primary light source 102 enters the light guide 101, travels along its length, and gets deflected one or more times by the light deflecting particles 104, till it gets deflected into a direction such that it exits the light guide 101. The light source system 199 thus emits light along the length of the light guide 101. The light deflecting properties of light deflecting particles can be altered by changing their material, their refractive index, their size, their shape, their size distribution, their shape distribution, etc.

The axis of variation 105 is an axis along the length of the light guide 101, i.e. one that lies from an end of the light guide near the primary light source 102, towards the other end. The concentration of light deflecting particles 104 may be constant, or may be varied along the axis of variation 105. I.e. concentration of light deflecting particles 104 in the light guide 101 is a function of distance from the primary light source 102 along the axis of variation 105. This function is called a concentration variation function. If the concentration of light deflecting particles 104 is constant, then the concentration variation function is a constant function.

At each point of the light exit surface of the light guide 101, light is emitted in various directions. In certain applications, the total light emitted in all directions is important. In certain other applications, light emitted in a particular direction, say the forward direction where a viewer might be present is important. In certain applications, the light emitted in a particular set of directions is important. For example, the light guide may have refracting or reflecting optics above or below it that focuses light in a particular way, so that light from a particular set of directions transmits into a particular set of important directions. Any such important number relating to an amount of light is called a light emission value at that particular point of the light exit surface of the light guide 101. Thus, the light emission value may be the inner product of a function expressing emitted light power as a function of direction, and a weighing function expressing how much each direction is important in determining the light emission value. In certain applications, light polarized in a certain direction, or circularly polarized in a particular sense etc. is important. Thus, the light emission value may be the inner product of a function expressing the Stokes parameters of light as a function of direction, and a weighing function expressing how much each Stokes parameter in each direction is important in determining the light emission value. In certain applications, light of a particular wavelength, or a group of wavelengths is important. Thus, the light emission value may be the inner product of a function expressing the Stokes parameters of light as a function of direction and wavelength, and a weighing function expressing how much each Stokes parameter in each direction of light of each wavelength is important in determining the light emission value.

A light emission function is a function describing how the light emission value changes with distance from the primary light source 102, along the axis of variation 105. In an embodiment, all points on the light exit surface of the light guide at a particular distance from the primary light source 102 have the same or substantially similar light emission values. In another embodiment, the light emission values of all points at a particular distance from the primary light source 102 are averaged to give a single effective light emission value, which changes with distance from the primary light source 102.

According to an embodiment, there is a first light source system and a second light source system, which are built similarly to each other in terms of materials, shape, mirrors and primary light sources, but may have a different total length along their axes of variation, and may have different concentration variation functions. The first light source system and the second light source system have the same kind of light deflecting particles, and the same total number or mass or volume of light deflecting particles. I.e., the concentration variation functions of the two light sources have equal total integration. Thus, there exists a mutator function which mutates the concentration variation function of the first light source system into the concentration variation function of the second light source system. The same mutator function mutates the light emission function of the first light source system into the light emission function of the second light source system.

Thus, to design the second light source system to have a particular required light emission function, the mutator function that mutates the light emission function of the first light source system into the required light emission function of the second light source system is found, and then the same mutator function is used to mutate the concentration variation function of the first light source system into the concentration variation function of the second light source system. When the second light source system is made having the concentration variation function thus found, it will have the required light emission function.

In effect, the second light source system has a concentration variation function which is the mutation of the concentration variation function of a first light source system due to the mutator function that mutates the light emission function of the first light source system into the required light emission function of the second light source system.

In an embodiment, the mutator function that mutates the concentration variation functions and the mutator function that mutates the light emission function are not exactly the same, but similar enough that one may be used as an approximation of another. In this case, the above methodology may be applied repeatedly to converge towards the required light emission function. I.e. in cases where the actual light emission function of the second light source system is not exactly the required light emission function, a third light source system may be designed from the second light source system in a similar manner to the way the second light source system was designed from the first, i.e. the third light source system has a concentration variation function which is the mutation of the concentration variation function of the second light source system due to the mutator function that mutates the light emission function of the second light source system into the required light emission function.

Figure 2:
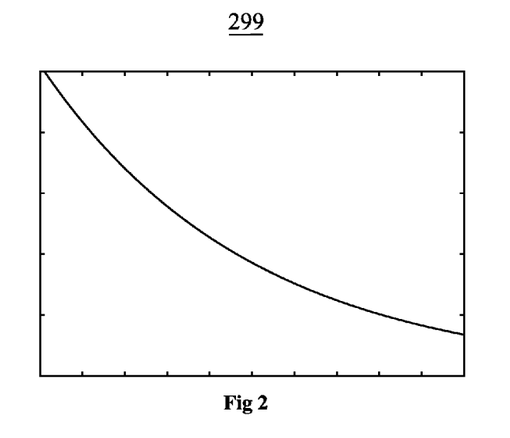
FIG. 2 depicts the light emission function of a first light source system, according to one embodiment.

FIG. 2 depicts the light emission function 299 of a first light source system, according to one embodiment. The light emission function 299 is the light emission function of a light source having a primary light source at one end, and a constant concentration variation function, with a uniform concentration C of light deflecting particles. The light emission function 299 is an exponential function of the distance from the light source end. I.e., the light emission function 299 is $$Ae^{ax}$$ [Math. 10]

where A is a constant called the modal strength,
a is a constant called the modal eigenvalue and
x is the distance from the primary light source along the axis of variation.

Let the total distance from the primary light source end to the other end of the light source be X.

Suppose, a second light source system is built similarly in terms of materials, shape, mirrors, primary light sources and kind of light deflecting particles, has the same total amount of light deflecting particles, but has a different concentration variation function. Suppose the length of the light guide of this second light source system is Y, and the light emission function of the second light source system is a constant B. The relation between A, a, X, B and Y is given by $$BY = \frac{A}{a}(1 - e^{-aX})$$ [Math. 11]

'a' is a constant dependent on the type of light deflecting particles used, and on the concentration C. Given any three of A, X, B and Y, the fourth can be found from the above relation. For example, given A, X and Y, we can find out B, the constant light emission value over the entire surface of the second light source system. As another example, we want to design the second light source system to have a particular constant light emission value B over the entire surface of length Y along the axis of variation. Furthermore, in an embodiment, the first light source system has the light emission function $$Ae^{-ax}$$ [Math. 12]

irrespective of the total length X of the light guide of the first light source system. Then, the total length X can be chosen from the above formula so that the first light source system is such that the required second light source system can be designed from it. The total length X of the light guide of the first light source system will be given by $$X = \frac{-\log(1 - YaB/A)}{a}$$ [Math. 13]

which is feasible if and only if $(A/a) \geq BY$. If $(A/a)=BY$, then $X=\infty$.

The mutator function that mutates the light emission function 299

$$Ae^{-ax}$$ [Math. 14]

of the first light source system into the light emission function B of the second light source system is $$\frac{-\log(1 - yaB/A)}{a}$$ [Math. 15]

The constant function B and the mutator function above, are both functions of y, the distance from the primary light source of the second light source system along the axis of variation of the second light source system.

This mutator function is used to mutate the constant concentration variation function C (a constant function of x), to the concentration variation function of the second light source system. The concentration variation function of the second light source system is $$CB/(A-yaB)$$

Figure 3:
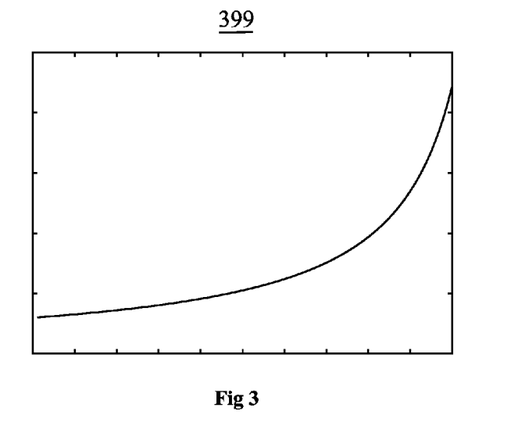
FIG. 3 depicts the concentration variation function of a second light source system, according to one embodiment.

FIG. 3 depicts the concentration variation function 399 of a second light source system, according to one embodiment. A second light source system has a light emission function which is constant or almost constant along the axis of variation. The concentration variation function of the second light source system is given by $$D1/(D2-D3y)$$

where D1, D2 and D3 are constants and y is the distance along the axis of variation of the light guide of the second light source system from the primary light source end. I.e. the concentration variation function is a constant D1 times the reciprocal of the subtraction from a constant D2 of a constant D3 times y. In an embodiment, the constant D1 is equal to CB, where C is the constant concentration of a first light source system and B is the constant light emission value of the second light source system. In an embodiment, the constant D2 is A, which is the modal strength of the first light source system. In an embodiment, the constant D3 is aB, where a is the modal eigenvalue of the first light source system, and B is the constant light emission value of the second light source system.

Figure 4:
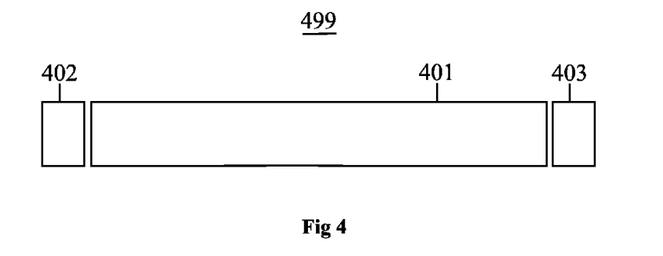
FIG. 4 depicts a light source system having two primary light sources, according to an embodiment.

FIG. 4 depicts a light source system 499 having two primary light sources, according to an embodiment. Primary light source 402 and primary light source 403 emit light into opposite ends of light guide 401.

Figure 5:
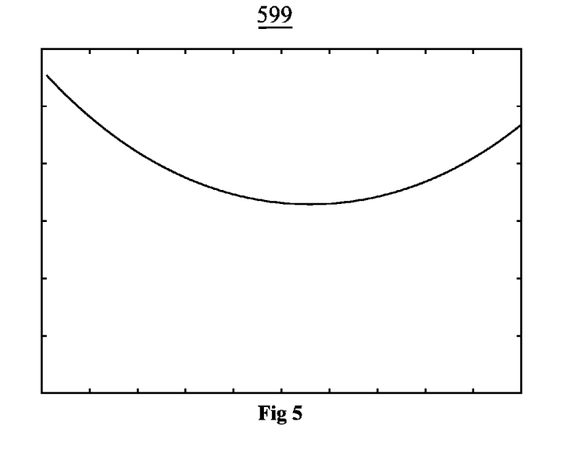
FIG. 5 depicts the light emission function of a first light source system having two primary light sources, according to an embodiment.

FIG. 5 depicts the light emission function 599 of a first light source system having two primary light sources, according to an embodiment. The light emission function 599 is the light emission function of a light source having primary light sources at two opposite ends, and a constant concentration variation function, with a uniform concentration C of light deflecting particles. The light emission function 599 is the sum of exponential functions of the distance from each light source end. I.e., the light emission function 599 is $$A_1 e^{-ax} + A_2 e^{a(x-X)}$$ [Math. 16]

where A1 is a constant called the left modal strength,
A2 is a constant called the right modal strength,
a is a constant called the modal eigenvalue,
x is the distance from one of the primary light sources (the left one) along the axis of variation, and
X is the total distance between the two ends having the two primary light sources.

In an embodiment, A1 equals A2, i.e. the two modal strengths are the same. This could happen if both the primary light sources have the same light output. If the primary light sources have different light outputs, in an embodiment, A1 and A2 will not be equal. Many primary light sources such as LEDs have a typical manufacturing variation in light output. In such cases, a primary light source with a higher light output at one end can be used with a primary light source with a lower light output at the other end, so that the manufacturing variation in primary light sources does not lead to manufacturing variation in light source systems. In an embodiment, the light sources are chosen such that A1+A2 is a particular constant even if A1 and A2 change individually. In an embodiment, the light sources are chosen such that the sum of the power emitted by both is a particular constant.

Suppose, a second light source system is built similarly to the first light source system in terms of materials, shape, minors, primary light sources and kind of light deflecting particles, has the same total amount of light deflecting particles, but has a different concentration variation function. Suppose the length of the light guide of this second light source system is Y, and the light emission function of the second light source system is a constant B. The relation between A1, A2, a, X, B and Y is given by $$BY = \frac{A_1 + A_2}{a}(1 - e^{aX})$$ [Math. 17]

'a' is a constant dependent on the type of light deflecting particles used, and on the concentration C. Given any four of A1, A2, X, B and Y, the fifth can be found from the above relation. For example, given A1, A2, X and Y, we can find out B, the constant light emission value over the entire surface of the second light source system. As another example, we want to design the second light source system to have a particular constant light emission value B over the entire surface of length Y along the axis of variation. Furthermore, in an embodiment, the first light source system has the light emission function $$A_1 e^{-ax} + A_2 e^{a(x-X)}$$ [Math. 18]

for any total length X of the light guide of the first light source system. Then, the total length X can be chosen from the above formula so that the first light source system is such that the required second light source system can be designed from it. The total length X of the light guide of the first light source system will be given by $$X = \frac{-\log(1 - YaB/(A_1 + A_2))}{a}$$ [Math. 19]

which is feasible if and only if $(A_1+A_2)/a \geq BY$. If $(A_1+A_2)/a = BY$, then $X = \infty$.

The mutator function that mutates the light emission function 599, $$A_1 e^{ax} + A_2 e^{a(x-X)}$$ [Math. 20]

of the first light source system into the light emission function B of the second light source system is $$D_{10} + D_{11} \log D_{12}(-(D_{13}-y) + \sqrt{(D_{14}-y)^2 + D_{15}})$$ [Math. 21]

The constant function B and the mutator function above, are both functions of y, the distance from the primary light source of the second light source system along the axis of variation of the second light source system.

The constants in the above expression for the mutator function may be set to the following values: D10=Q, D11=1/a, D12=1/(2G), D13=E, D14=E and D15=4G². Where $$G = \frac{R}{aB}$$ [Math. 22]

$$E = \frac{R}{aB}(e^{aQ} - e^{-aQ})$$

$$R = \sqrt{A_1 A_2}\, e^{-aX/2}$$

$$Q = \frac{1}{2a} \log \frac{A_1}{A_2 e^{aX}}$$

This mutator function is used to mutate the constant concentration variation function C (a constant function of x), to the concentration function of the second light source system. The concentration variation function of the second light source system is $$\frac{D_{16}}{\sqrt{(D_{17} - y)^2 + D_{18}}}$$ [Math. 23]

The constants in the above expression for the concentration variation function may be set to the following values: D16=C/a, D17=E and D18=4G².

Figure 6:
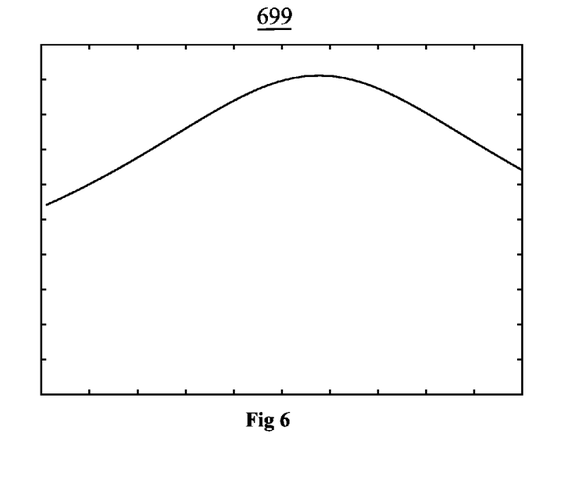
FIG. 6 depicts the concentration variation function of a second light source system having two primary light sources, according to one embodiment.

FIG. 6 depicts the concentration variation function 699 of a second light source system having two primary light sources, according to one embodiment. A second light source system has a light emission function which is constant or almost constant along the axis of variation. The concentration variation function of the second light source system is given by $$\frac{D_{16}}{\sqrt{(D_{17} - y)^2 + D_{18}}}$$ [Math. 24]

where D16, D17 and D18 are constants and y is the distance along the axis of variation of the light guide of the second light source system from the left primary light source end. I.e. the concentration variation function is a constant D16 times the reciprocal of the square root of the sum of a constant D18 and the square of the difference between a constant D17 and y.

Figure 7:
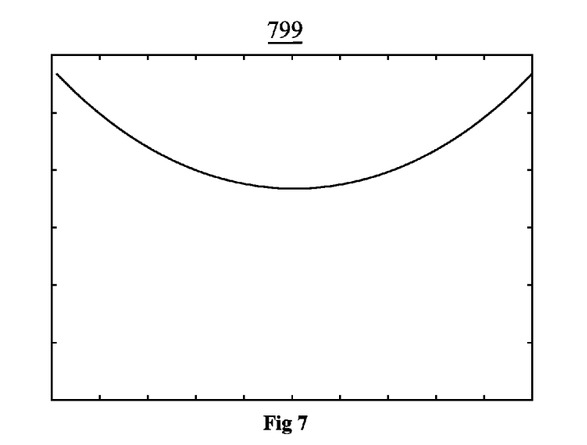
FIG. 7 depicts the light emission function of a first light source system having two primary light sources, according to one embodiment.

FIG. 7 depicts the light emission function 799 of a first light source system having two primary light sources, according to one embodiment. The light emission function 799 is the light emission function of a light source having primary light sources at two opposite ends, and a constant concentration variation function, with a uniform concentration C of light deflecting particles. The light emission function 799 is the sum of exponential functions of the distance from each light source end. I.e., the light emission function 799 is $$A_1 e^{-ax} + A_2 e^{a(x-X)}$$ [Math. 25]

Furthermore, A1 and A2 are equal or almost equal. This happens when the two light sources have equal or close to equal power. The expressions for mutator function and concentration variation function now use the following values of R and Q.

$$R = A_1 e^{-aX/2}$$ [Math. 26]

$$Q = \frac{X}{2}$$

Figure 8:
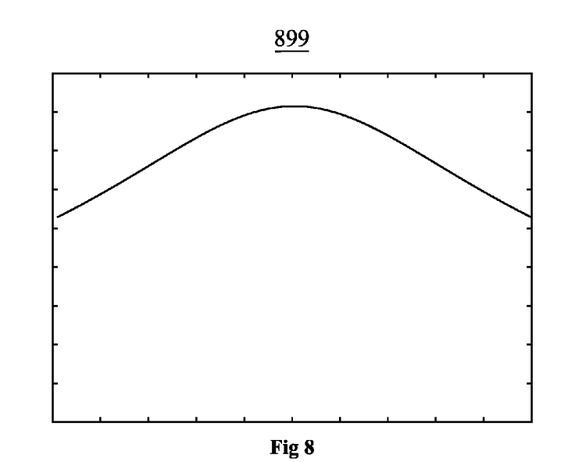
FIG. 8 depicts the concentration variation function of a second light source system having two primary light sources, according to one embodiment.

FIG. 8 depicts the concentration variation function 899 of a second light source system having two primary light sources, according to one embodiment. A second light source system has a light emission function which is constant or almost constant along the axis of variation. A1 and A2 are taken to be equal in this embodiment. This embodiment is used when the two primary light sources produce equal or close to equal light. This embodiment may also be used even though the two primary light sources do not produce equal light, as an approximation.

Figure 9:
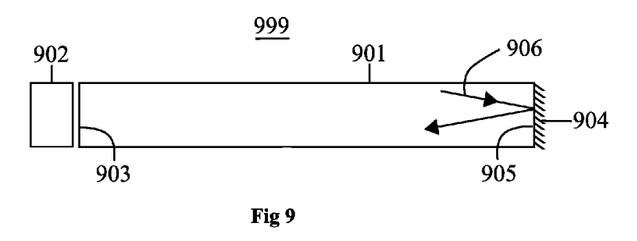
FIG. 9 depicts a light source system having a mirrored end, according to an embodiment.

FIG. 9 depicts a light source system 999 having a mirrored end, according to an embodiment. Primary light source 902 emits light into one end 903 of light guide 901. The opposite end 905 of the light guide 901 has a minor 904 deposited on or near it, so that light 906 reaching the end 905 is sent back into the light guide 901.

In an embodiment, a first light source having a uniform concentration C has a light emission function $$A_1 e^{-ax} + A_2 e^{a(x-X)} \quad [\text{Math. 27}]$$

A2 may be approximately $$A_1 e^{-aX} \quad [\text{Math. 28}]$$

times the efficiency of the mirror 904. The mutator function to create a uniform second light source system and the concentration variation function of the uniform second light source system having a mirrored end can be appropriately found.

Figure 10:
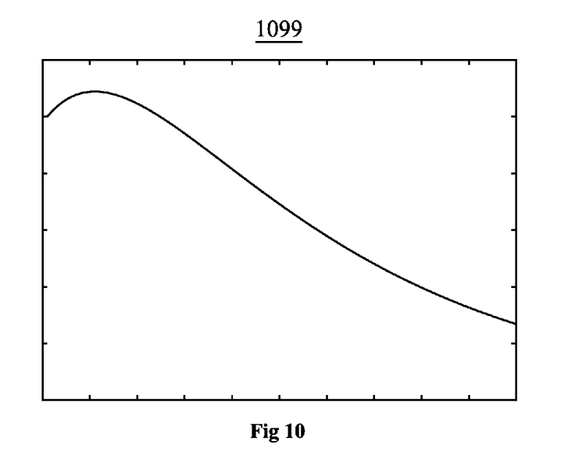
FIG. 10 depicts the light emission function of a first light source system, according to one embodiment.

FIG. 10 depicts the light emission function 1099 of a first light source system, according to one embodiment. The light emission function is the light emission function of a light source system having one primary source or two primary sources or a primary source and a mirrored end, and a uniform concentration C. The light emission function 1099 is a sum of exponential functions of the distance from one end. I.e., the light emission function 1099 is $$\sum_{i=1}^{k} A_i e^{-a_i x} \quad [\text{Math. 29}]$$

where each Ai is a constant called the modal strength of the mode i, each ai is a constant called the modal eigenvalue of the mode i and x is the distance from one end along the axis of variation.

The light emission function of any light source system having a uniform concentration C can be approximated to an arbitrary degree of accuracy when enough modes are used in the expression. Some modal strengths might be negative. Some modal eigenvalues might be negative too. In many cases, good accuracy is achieved using only two modes, one with a positive modal strength, and one with possibly a negative modal strength (as depicted in light emission function 1099).

The light emission function of the first light source system may be evaluated by measuring the light emitted at various points, or by computer or mathematical simulation. After measurement or simulation, if the expression is not directly in the form of sum of exponentials, it may be approximated to be a sum of exponentials by exponential curve fitting.

A second light source system having a constant light emission function can be designed by choosing an appropriate concentration variation function, as described above.

For light source systems having light sources at both ends, in an embodiment, for every modal eigenvalue, there is an equal but opposite in sign modal eigenvalue for a different mode. Furthermore, for same or similar light sources, the modal strengths are such that the value of a mode at one end is equal to the value of the mode with the opposite eigenvalue at the opposite end. I.e., the light emission function may be represented as $$\sum_{i=1}^{k} A_{1i} e^{-a_i x} + A_{2i} e^{a_i (x-X)} \quad [\text{Math. 30}]$$

with A1i=A2i if the light sources at both ends are substantially similar. Similarly, for light source systems having a light source at one end and a mirror at the other end, for every modal eigenvalue, there will be an eigenvalue with an equal but opposite sign, but the modal strengths will not be equal.

For a difference in light output of the two primary light sources, the modal strengths A1i and A2i may not be the same. Yet, uniform light output may be achieved, and thus, manufacturing variance in primary light sources may be reduced. In an embodiment, primary light sources with higher light output are coupled with primary light sources with lower light output. A certain fixed number of distinct concentration variation functions may be built, and appropriate primary light sources chosen, which correspond to those concentration variation functions.

Figure 11:
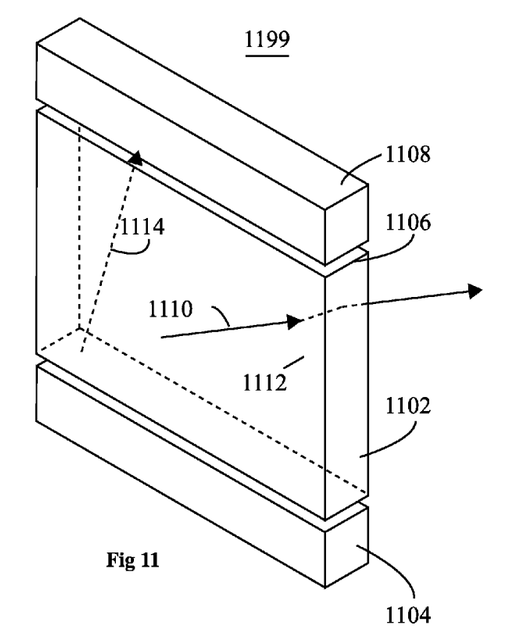
FIG. 11 depicts a surface light source according to one embodiment.

FIG. 11 depicts a surface light source 1199, according to one embodiment. Surface light source 1199 has a light guide 1102 in the form of a sheet and a linear light source 1104 emitting light into one end of the light guide 1102. The linear light source 1104 is a light source extended primarily in one direction, such as a fluorescent tube, a bank of LEDs, or a light source system as disclosed in the present patent. The other end 1106 may have a mirror next to it, or another linear light source 1108.

In an embodiment, the concentration of light deflecting particles in the surface light source is kept sparse enough for a substantial amount of the light (such as light ray 1110) entering the large face 1112 of the light guide 1102 to pass through it without deflection. This creates a surface light source which is transparent to transverse light. In an embodiment, to keep the concentration low, the surface light source 1199 is designed from a first light source having a low product of concentration and length. This may mean that not all light (such as light ray 1114) entering the light guide 1102 from the linear light source 1104 will get deflected. Some of it may travel to the other end. In this case, a mirror at the other end increases the efficiency. In another embodiment, the other end also has a linear light source 1108 which is a light source system according to the present invention. Such a linear light source may also be made transparent to light entering it from outside (such as light ray 1114), and with the help of a reflector, such light can be made to reenter the light guide 1102.

Such reduction in the concentration of the light deflecting particles also reduces the variation required in the concentration of particles, and makes it easier to manufacture the surface light source 1199.

A transparent surface light source may thus be built, with uniform or any preferred light emanation function. Such a transparent light source may be used to see through it. For example it may be used to augment a one way mirror, or as a light source from behind which an image can be captured. It may be used as the backlight of a flat screen display, and an image may be captured by a camera from behind the display through the transparent backlight. It may be used as the backlight of a transflective display, and the transparency of the backlight helps improve the efficiency in reflective mode. The transflective display may use a partial mirror between the backlight and the pixel display panel, in which case the transparency of the transparent backlight also improves efficiency in the transmissive mode. The efficiency of flat screen displays such as liquid crystal displays may be improved if the backlight provides polarized light. A transparent backlight can be made to provide polarized light using a reflecting polarizer, and reflective optics (such as a mirror and a quarter wave plate) which rotate the polarization of light reflected by the reflecting polarizer. The efficiency of a backlight with a reflecting polarizer is greatly improved by use of a transparent backlight, since the transparent backlight lets light reflected from the reflecting polarizer to pass through it without altering its polarization state or without depolarizing it. A transparent light source may be augmented with refractive and reflective optics such that it emits light strongly in a narrow set of directions. Such a directional light source is useful as a backlight of displays in personal viewing applications.

Figure 12:
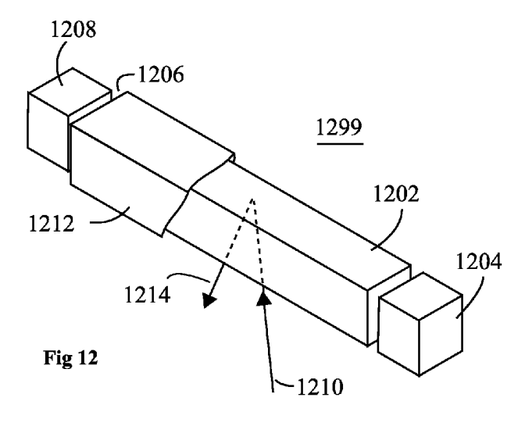
FIG. 12 depicts a linear light source according to one embodiment.

FIG. 12 depicts a linear light source 1299, according to one embodiment. Linear light source 1299 has a light guide 1202 primarily extended in one direction, and a light source 1204 emitting light into one end of the light guide 1202. The other end 1206 may have a minor next to it, or another light source 1208.

In an embodiment the concentration of light deflecting particles in the light guide 1202 is kept sparse enough for a substantial amount of the light (such as light ray 1210) entering from outside the light guide 1202 to pass through it without deflection. This creates a linear light source which is transparent to transverse light, having all the advantages described above. Furthermore, the linear light source 1299 may have mirrors 1212 so that light ray 1210 is reflected back into light ray 1214, traveling generally in the opposite direction. If the linear light source 1299 if used as a primary light source for a surface light source (made according to this patent or in other standard ways), it improves the efficiency of light utilization in the following way. Light from a light source at the other end of the surface light source, or reflected back from a mirror at the other end of the surface light source is reflected back into the light guide of the surface light source. Similarly, light that is scattered by light scattering particles or other light extraction means in the light guide of the surface light source, and gets scattered towards the linear light source end, is reflected back into the light guide of the surface light source.

Figure 13A:
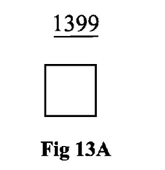
FIG. 13A depicts the cross sectional shape of a linear light source, which has a square as the cross-section.

FIG. 13A depicts the cross sectional shape 1399 of a linear light source, which has a square as the cross-section.

Figure 13B:
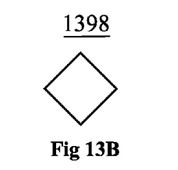
FIG. 13B depicts the cross sectional shape of a linear light source, which has a square rotated by 45 degrees as the cross-section.

FIG. 13B depicts the cross sectional shape 1398 of a linear light source, which has a square rotated by 45 degrees as the cross-section.

Figure 13C:
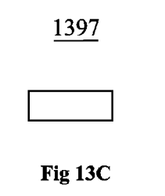
FIG. 13C depicts the cross sectional shape of a linear light source, which has a rectangle with its longer edges towards the top and bottom as the cross-section.

FIG. 13C depicts the cross sectional shape 1397 of a linear light source, which has a rectangle with its longer edges towards the top and bottom as the cross-section.

Figure 13D:
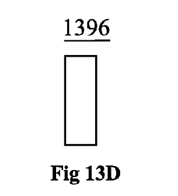
FIG. 13D depicts the cross sectional shape of a linear light source, which has a rectangle with its shorter edges towards the top and bottom as the cross-section.

FIG. 13D depicts the cross sectional shape 1396 of a linear light source, which has a rectangle with its shorter edges towards the top and bottom as the cross-section.

Figure 13E:
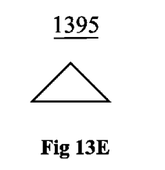
FIG. 13E depicts the cross sectional shape of a linear light source, which has a right-angled triangle with the right-angled corner pointing upwards as the cross-section.

FIG. 13E depicts the cross sectional shape 1395 of a linear light source, which has a right-angled triangle with the right-angled corner pointing upwards as the cross-section.

Figure 13F:
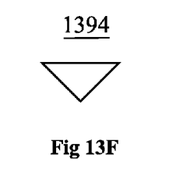
FIG. 13F depicts the cross sectional shape of a linear light source, which has a right-angled triangle with the right-angled corner pointing downwards as the cross-section.

FIG. 13F depicts the cross sectional shape 1394 of a linear light source, which has a right-angled triangle with the right-angled corner pointing downwards as the cross-section.

Figure 13G:
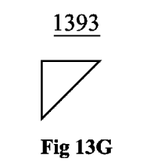
FIG. 13G depicts the cross sectional shape of a linear light source, which has a right-angled triangle with a non-right-angled corner pointing downwards as the cross-section.

FIG. 13G depicts the cross sectional shape 1393 of a linear light source, which has a right-angled triangle with a non-right-angled corner pointing downwards as the cross-section.

Figure 13H:
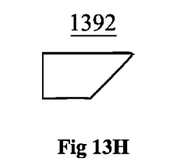
FIG. 13H depicts the cross sectional shape of a linear light source, which has a trapezium with one of its non-parallel sides oriented perpendicular to the parallel sides as the cross-section.

FIG. 13H depicts the cross sectional shape 1392 of a linear light source, which has a trapezium with one of its non-parallel sides oriented perpendicular to the parallel sides as the cross-section.

Figure 13I:
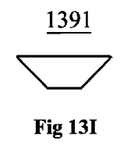
FIG. 13I depicts the cross sectional shape of a linear light source, which has a trapezium with its larger parallel edge towards the top as the cross-section.

FIG. 13I depicts the cross sectional shape 1391 of a linear light source, which has a trapezium with its larger parallel edge towards the top as the cross-section.

Figure 13J:
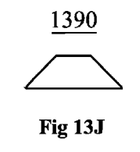
FIG. 13J depicts the cross sectional shape of a linear light source, which has a trapezium with its smaller parallel edge towards the top as the cross-section.

FIG. 13J depicts the cross sectional shape 1390 of a linear light source, which has a trapezium with its smaller parallel edge towards the top as the cross-section.

Figure 13K:
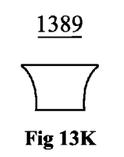
FIG. 13K depicts the cross sectional shape of a linear light source, which has a trapezium with inwardly curved non-parallel edges and its larger parallel edge towards the top as the cross-section.

FIG. 13K depicts the cross sectional shape 1389 of a linear light source, which has a trapezium with inwardly curved non-parallel edges and its larger parallel edge towards the top as the cross-section.

Figure 13L:
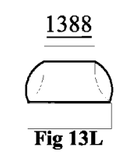
FIG. 13L depicts the cross sectional shape of a linear light source, which has a trapezium with outwardly curved non-parallel edges and its smaller parallel edge towards the top as the cross-section.

FIG. 13L depicts the cross sectional shape 1388 of a linear light source, which has a trapezium with outwardly curved non-parallel edges and its smaller parallel edge towards the top as the cross-section.

Figure 13M:
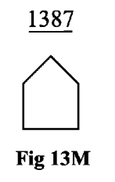
FIG. 13M depicts the cross sectional shape of a linear light source, which has a pentagon with one of its corners pointing upwards as the cross-section.

FIG. 13M depicts the cross sectional shape 1387 of a linear light source, which has a pentagon with one of its corners pointing upwards as the cross-section.

Figure 13N:
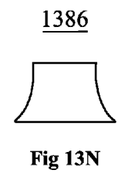
FIG. 13N depicts the cross sectional shape of a linear light source, which has a trapezium with inwardly curved non-parallel edges and its smaller parallel edge towards the top as the cross-section.

FIG. 13N depicts the cross sectional shape 1386 of a linear light source, which has a trapezium with inwardly curved non-parallel edges and its smaller parallel edge towards the top as the cross-section.

Figure 13O:
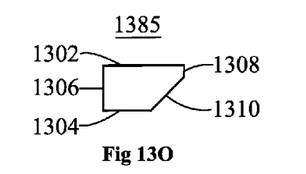
FIG. 13O depicts the cross sectional shape of a linear light source, according to one embodiment.

FIG. 13O depicts the cross sectional shape 1385 of a linear light source, according to one embodiment. The cross-section is a five-sided figure with two horizontal edges 1302 and 1304 of different lengths, such that the longer edge 1302 is towards the top of the figure. Two vertical edges 1306 and 1308 of different lengths are in such a way that the longer of the two 1306, connects the two horizontal edges (forming two corners) and the shorter 1308, forms a corner with the other remaining end of the longer horizontal edge 1302. The two remaining ends, one each from the shorter horizontal edge 1304 and from the shorter vertical edge 1308 are joined together using the fifth slant edge 1310.

Figure 13P:
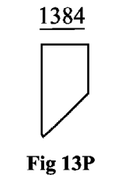
FIG. 13P depicts the cross sectional shape of a linear light source, which has a trapezium cross-section with vertical edges parallel.

FIG. 13P depicts the cross sectional shape 1384 of a linear light source, which has a trapezium cross-section with vertical edges parallel. The top edge is perpendicular to the two parallel edges.

Figure 14:
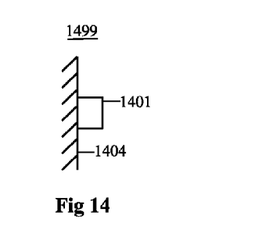
FIG. 14 depicts a point light source according to one embodiment.

FIG. 14 depicts a point light source 1499, according to one embodiment. The point light source 1499 comprises a light source 1401 and a minor 1404. When the point light source 1499 is used as a primary light source for a linear light source, the minor 1404 reflects back light from a light source at the other end, or that has bounced of a mirror at the other end, or that has scattered back from a scattering particle or light extracting feature, thus improving efficiency of utilization of light.

Figure 15:
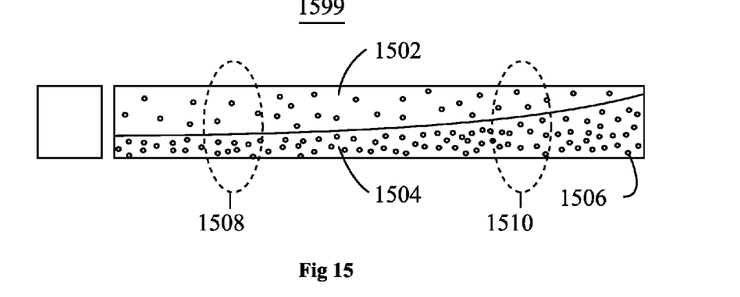
FIG. 15 depicts a light source system according to one embodiment.

FIG. 15 depicts a light source system 1599, according to one embodiment. The light source system 1599 has a light guide made up of at least two regions, region 1502 and region 1504. The at least two regions have two different concentrations of light deflecting particles 1506, and the regions have different thicknesses in different places along the axis of variation. Thus, the average concentration in an area 1508 is different from the average concentration in an area 1510, and this way a concentration variation function may be implemented. The two regions region 1502 and region 1504 may be optically coupled by merging, fusing, producing them together, or by using optical adhesives. The regions region 1502 and region 1504 may also be merged, fused or diffused into each other using diffusion by heat, or before they are formed into a solid (e.g. when the two regions are still a polymer slurry) so that in the end distinct regions such as region 1502 and region 1504 are not discernible, but still there is a concentration variation along the axis of variation.

Figure 16:
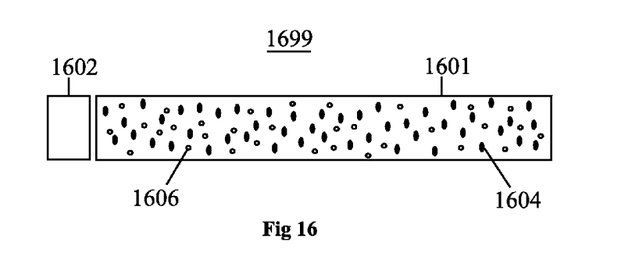
FIG. 16 depicts a light source system according to one embodiment.

FIG. 16 depicts a light source system 1699, according to one embodiment. A primary light source 1602 emits light into a light guide 1601. The light guide includes light deflecting particles 1604 situated according to a concentration variation function. The light guide also includes one or more types of photoluminescent particles 1606, which are situated according to the same or a different concentration variation function. The photoluminescent particles convert light of one wavelength to light of another wavelength. For example, a primary light source emitting blue light may put together with photoluminescent material giving broad spectrum light to create white or whitish light. As another example, a primary light source emitting blue light may be put together with photoluminescent material or materials giving narrow spectra, such as green and red. A light source that produces one or more band of narrow spectra is useful as a backlight for transmissive (esp. color) displays, as it produces more vivid colors with greater efficiency.

Photoluminescent material may be included in linear light sources, or surface light sources, or in systems having both, one or both light sources.

In an embodiment, the photoluminescent particles convert a first wavelength to a second wavelength, whereas the light deflecting particles scatter the first wavelength less than the second wavelength.

In an embodiment, the concentration variation function for the photoluminescent particles and the concentration variation function for the light deflecting particles bears a linear relationship. In an embodiment, the two concentration variation functions bear an affine relationship. In an embodiment, more than two concentration variation functions for various types of light deflecting particles and photoluminescent particles bear linear or affine relationships with each other.

For a system having more than one species of light deflecting particles (some of which may be photoluminescent), each species of light deflecting particles has an associated concentration variation function. If the concentration variation functions of the same species in a second light source are obtained by mutating the corresponding concentration variation functions in the first light source by a particular mutator function, the particular mutator function used being the same mutator function for all the species present, then any light emission function of the second light source is obtained by mutating the corresponding light emission function of the first light source by the same mutator function.

Thus, to design the second light source system to have a particular required light emission function, the mutator function that mutates the light emission function of the first light source system into the required light emission function of the second light source system is found, and then the same mutator function is used to mutate the concentration variation function of each species of the first light source system into the concentration variation function of the same species in the second light source.

The invention claimed is:

1. An apparatus comprising a light guide with light deflecting particles wherein,
   the light deflecting particles are arranged according to a first concentration variation function, wherein,
   the first concentration variation function is obtained by mutating a concentration variation function of a second light source by the same mutator function that mutates the light emission function of the second light source into the light emission function of the first light source wherein,
   the light emission function of the second light source is characterized as a mixture of more than two modes, each mode being an exponential function with respect to distance from one end of a light guide that the second light source is comprised of.

2. The apparatus of claim 1, wherein a mutator function is a function that mutates a first function into a second function by multiplying the composition of the first function and the mutator function with the derivative of the mutator function.

* * * * *